Patented July 22, 1941

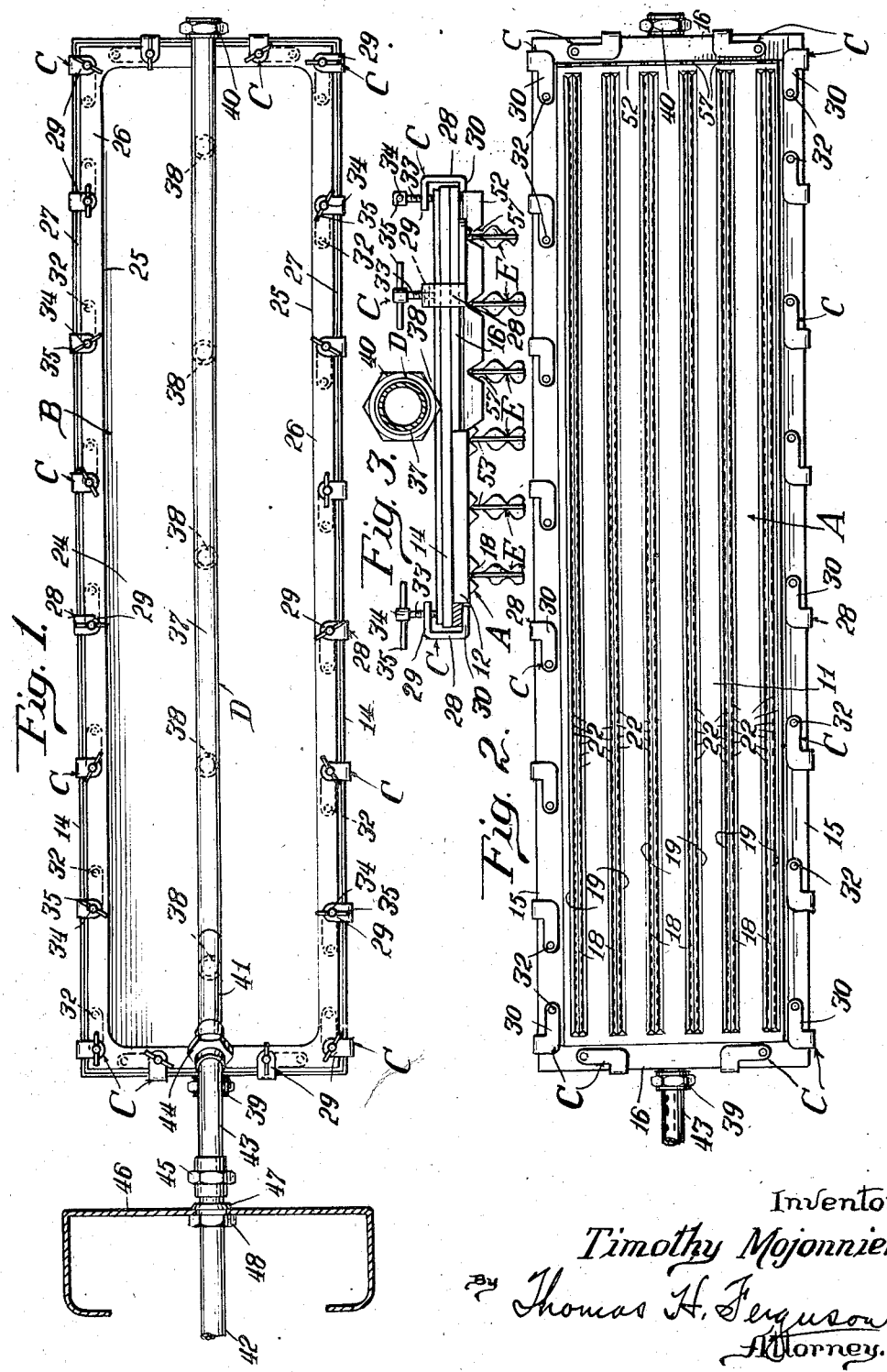

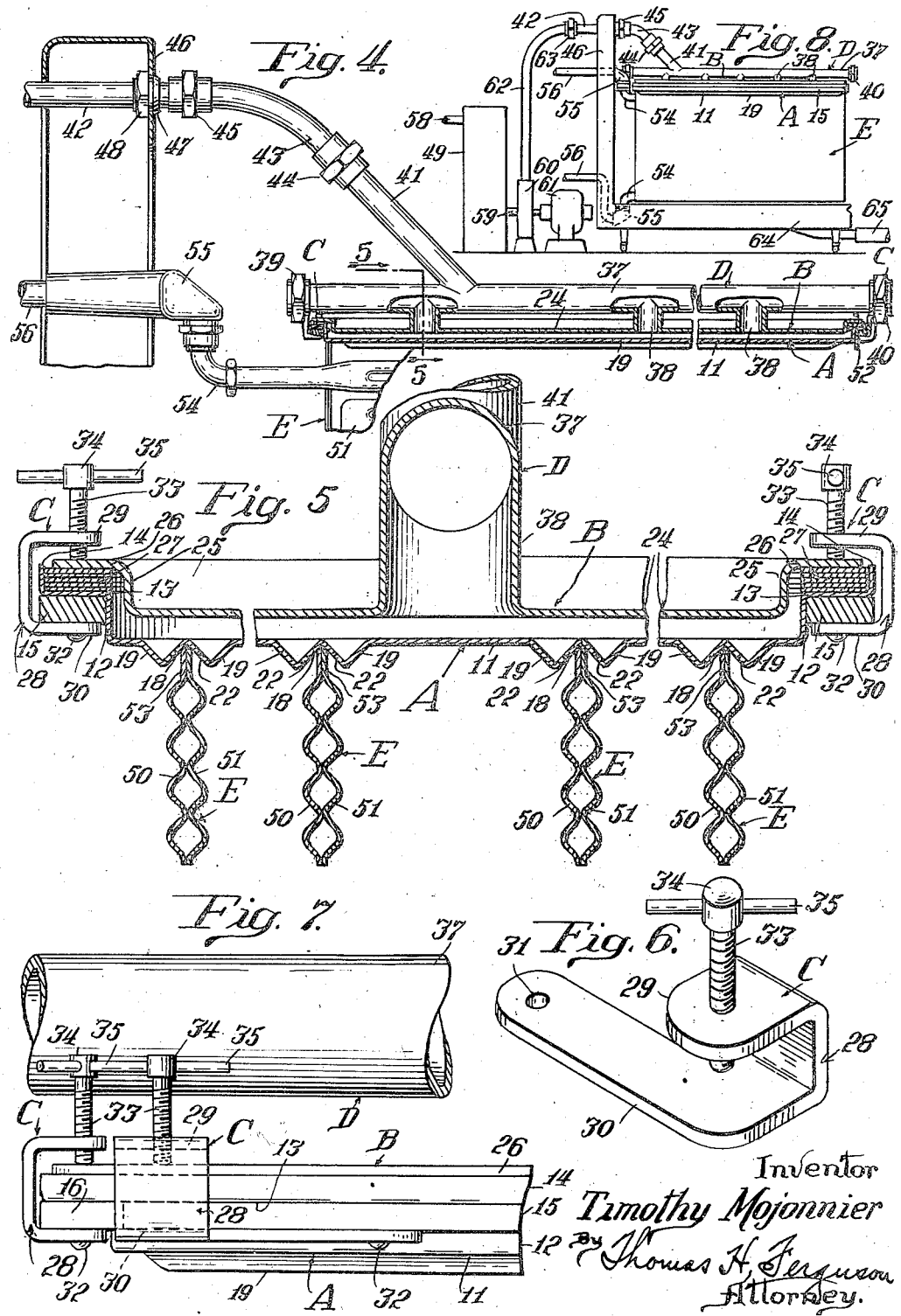

2,249,846

UNITED STATES PATENT OFFICE 2,249,846

DISTRIBUTOR FOR HEAT EXCHANGERS

Timothy Mojonnier, Oak Park, Ill., assignor to Mojonnier Bros. Co., a corporation of Illinois Application December 28, 1939, Serial No. 311,235

5 Claims. (Cl. 299—58)

The present invention relates to distributors for heat exchangers and more particularly to distributors for use with heat exchange elements of the trickle type.

One object of the invention is to provide a novel distributor of the class mentioned which will withstand a considerable internal pressure and thus be suited to the receiving and handling of liquids delivered to it under pressure. Another object is to construct the distributor so that when it is used as part of the apparatus of a short-time pasteurization system it will contribute to maximum efficiency for the whole system. To this end the distributor has a novel supply manifold and a shallow holder for the liquid, as well as other features. Another object is to so construct the distributor that foaming will be reduced to a minimum in cases where the liquid being treated is a liquid which will foam, as is the case with milk and milk products. This is brought about by greatly limiting the space within the distributor so that only a very small part of the milk or the like is in transit through the distributor at any instant. Another object is to so construct and arrange the distributor and its parts that the same may be readily separated for cleaning and as readily reassembled. Other objects have to do with durability, economy of manufacture, ease of handling and the like.

The various objects, features and advantages of the invention will be best understood upon reference to the following detailed description taken in connection with the accompanying drawings, while the scope of the invention will be particularly pointed out in the appended claims.

In said drawings, Fig. 1 is a plan view of a distributor constructed and arranged in accordance with the present invention, shown in association with a portion of the frame of a trickle type heat exchanger. Fig. 2 is an underneath plan view of the distributor. Fig. 3 is an end elevation of the same, upon a somewhat larger scale, showing particularly the relation of the aligning guide to the associated heat exchange elements, parts being broken away and omitted for clearness. Fig. 4 is a side elevation of the distributor in association with a portion of the exchanger, a central portion of the distributor being broken out to bring the figure within the limits of the drawings. Fig. 5 is a transverse section of the distributor upon a somewhat larger scale, the plane of section being indicated by the line 5—5 of Fig. 4. Fig. 6 is a perspective view of one of the clamps employed in securing the cover and pan of the distributor together. Fig. 7 is an elevational view illustrating two clamps in position at one corner of the distributor. And Fig. 8 is a diagrammatic view illustrating the distributor in position upon a heat exchanger and having its manifold connected to a supply pump, operative to furnish the liquid to be treated, under pressure. Throughout these views like characters refer to like parts.

In brief, the novel distributor comprises a pan A, a cover B, a series of securing clamps C, and a manifold D. The distributor, when in service, is associated with trickle type heat exchanger elements, such as the elements E. These, in the present disclosure, take the form illustrated in United States Patent No. 2,179,949, granted November 14, 1939.

Referring now to the drawings in detail, it will be seen that the pan A comprises a rectangular bottom 11 surrounded by a low vertical wall 12 formed at its ends and sides. At the top of the wall 12 is an outwardly extending ledge or shelf 13 which also extends all the way around the pan. The outer edge of this ledge terminates in a vertical upstanding final wall 14. These several pan parts are preferably made of sheet metal formed and secured together as shown. If desired, all the pan may be pressed into the form shown, out of a single piece of sheet metal. Or again, some parts may be made by pressing and others by cutting. Cut parts are preferably secured together or in place by welding.

It will be noted that the peripheral wall 12 and ledge 13 are fitted to rest upon, and be secured to, a rectangular frame made up of side members 15 and end members 16, suitably secured together at their ends as by welding. The sheet metal of the wall 12 and ledge 13 of the pan preferably are permanently secured to the rectangular frame members 15 and 16 by welding. The completed pan structure A is thus produced. It is movable as a unit. It should be remarked also that the peripheral wall 12 is a low wall. This means that the pan A is a very shallow pan.

The bottom 11 of the pan A is provided with a series of lengthwise depressions arranged in sets. Each set is produced by giving the material of the bottom a W-shaped cross-section. In each set there are therefore inner inclined walls 18, meeting at an angle and forming a central inverted groove, and outer inclined walls 19 meeting the lower edges of the walls at an angle, and thus forming two outer companion grooves or gutters. The central gutter opens downward and the outer gutters open upward. These sets of gutters run lengthwise of the bottom 11 and are spaced apart given distances corresponding to the distances between the heat exchange elements E when the latter are in operative position. The walls 18 of the inverted central groove are provided with a series of openings 22. These are preferably small holes drilled through the material and arranged in staggered relation. These openings 22 are near the points of the outer grooves, as clearly shown. This groove structure is the same as that disclosed in said Patent No. 2,179,949, and perhaps a little more fully in United States Patent No. 2,040,947, granted May 19, 1936, and need not be further described. Viewed in another way, the pan bottom 11 is divided into a plurality of zones, alternately perforate and imperforate. Thus, the portions wherein the walls 18 and 19 and the openings 22 are located, are the perforate zones, whereas the portions lying between these perforated portions are plain bands or zones. They are the imperforate zones.

The cover B is also composed of metal, preferably sheet metal of a somewhat heavier gauge than that of the pan A. The cover consists of a rectangular sheet 24 surrounded by a low vertical wall 25 terminating in a horizontal outwardly extending ledge or flange 26. The wall 25 and flange 26 extend all the way around the cover and constitute its peripheral structure. The cover parts are of such dimensions that the cover fits into the pan, as clearly shown, particularly in Fig. 5, the walls 25 and 12 being adjacent and the flange 26 overlying and being spaced from the ledge 13. The flange 26 on the cover is also short enough so that it cannot engage the outer wall 14 of the pan A. The cover parts may be struck up from a single sheet of metal or made up of parts welded or otherwise secured together, as may be desired.

In order to space the cover B a proper distance above the pan A, I employ a peripheral spacing and sealing member 27. This member is composed of a series of sheets or strips of rubber or like cushioning material imposed one upon another to give the desired thickness. Each sheet is stamped out, or otherwise cut, to form a rectangular member which will extend all around the cover B and be substantially of the same size and outline as the flange 26. This means also that it will be of substantially the same shape and outline as the ledge 13. Instead of cutting out each constituent member in this way, the same may be formed of side strips and end strips which are suitably secured together at their ends to form the desired peripheral shape. Any desired member of constituent members may be used. When piled up together they form the composite member 27. The thickness of the member 27 determines the distance between the pan bottom 11 and the cover plate 24, the thinner the member 27, the shallower the covered pan and the less the liquid it can hold, and, obviously, the less it will pass, other things being equal.

It will now be clear that when the cover B is positioned upon the pan A with the sealing member 27 in place, then the clamps C may be positioned so as to tightly secure the cover B in place upon the pan. The clamps for accomplishing this result may be variously formed but simple clamps of the kind shown will be quite satisfactory.

As shown, each clamp C includes a single hook-shaped member 28 having an upper arm 29, constituting the point of the hook, and a lower arm 30, constituting the shank of the hook. This single hook-shaped member 28 may be slipped into position with its shank 30 beneath the frame member 15 or 16, as the case may be, and its upper end 29 above the flange portion 26. Ordinarily, in order to keep the several clamps C in position, the shank of each is provided with an aperture 31 through which a pivot pin 32 may be passed. This pin may be a simple stud extending downward from the associated frame member, or it may be in the form of a rivet having a head which holds the clamp from complete disengagement from the frame but allows it to be swung about the rivet's axis as a pivot, far enough to free the cover B and allow it to be removed from the pan A without interference by the clamps. When the hooks 28 are put in clamping position so as to embrace the peripheries of the pan A and the cover B, and the clamps C are screwed down, then the members A and B are moved toward each other into firm engagement with intervening sealing member 27. Each clamp C is screwed down by a screw 33 which passes through a threaded opening in the upper arm 29 and presses at its lower end against the upper surface of the projection 26 of the cover. In the present instance the screw 33 has a head 34 through which extends a bar 35 which constitutes a handle for screwing the screw 33 into and out of clamping position. Obviously, with the cover B in place on the pan A, and the interposed sealing member 27 in place, it is possible to screw down all of the positioned clamps C and thus firmly secure the cover B in place upon the pan A and there will then be an air tight and liquid tight joint between the two.

When it comes to the manifold D, it will be seen that the same includes a longitudinal pipe 37 from which extend a series of nozzles 38. These nozzles are preferably short pieces of pipe which communicate with the interior of the pipe 37 above and with the interior of the covered pan below. Put in another way, the nozzles 38 extend downward from the pipe 37 and terminate in openings formed in the coverplate 24. At both ends the nozzles are permanently secured. This is preferably done by welding the parts together along their fitted meeting edges. The opposite ends of the pipe 37 are provided with caps 39 and 40. The pipe 37 is also provided with a branch pipe connection 41. This connection leads upward from the pipe 37 at an angle thereto, as clearly shown. The lower end of the pipe 41 is preferably secured to the pipe 37 by welding or other suitable means. It is through the branch 41 that the liquid which is to be treated, is passed into the distributor. In the present instance the upper end of the pipe 41 is connected to a supply pipe 42 through a curved connecting pipe 43. One end of the pipe 43 is connected to the pipe 41 by a sanitary coupling 44 while the other end of the pipe 43 is connected to the pipe 42 by a similar sanitary coupling 45. The pipe 42 is in the present instance firmly mounted in the frame plate 46 by means of a ferrule 47 pressing against one side of the plate 46 and a nut 48 engaging the opposite side of the plate. In the present instance five nozzles 38 are employed. Obviously, these may be varied in number, according to the judgment of the designer. When used as shown, they pass liquid into the distributor chamber at five points and thus divide up the incoming stream. It should be noted also that these nozzles 38 discharge upon a central one of the imperforate zones of the pan bottom 11. This brings the manifold pipe 37 at the center of the distributor, transversely considered, when the perforate zones are six in number as illustrated. Obviously, the manifold might be positioned off-center if desired, but in all cases, the nozzles should terminate above imperforate zones and not above perforate ones. The number and arrangement of perforate zones is a factor which would enter into the determination of the manifold's position.

As before indicated, the heat exchange elements E are like those disclosed in the aforesaid patents. Suffice it to say that each element is made up of two plates 50, 51 which are pressed up so as to provide counterparts having elevations and depressions. These counterparts are brought together face to face and welded along meeting lines and surfaces. The result is the production of a heat exchange element having an outer irregular surface and interior passages. The outer surfaces are in general character undulating and serve to increase the superficial area. The interior spaces or channels are arranged in sets to provide one or more continuous passages for the controlling fluid which is admitted to the element. As clearly shown, when the plates 50 and 51 are welded together they meet at their top edges to provide fins 53. These enter the central inverted grooves formed by the walls 18 of the bottom of the pan A, and are in position to receive liquid from the pan through the several openings 22 and to receive it upon their opposite sides. The interior passages are connected through hollow hinges 54 to manifolds 55 which are supplied with a suitable heat exchange medium through a pair of connecting pipes 56 associated with each manifold. In the present instance only one manifold 55 and one connecting pipe 56 are shown, except in the diagram of Fig. 8. This, however, should suffice since these parts are fully shown and described in detail in said Patent No. 2,179,949.

In connection with the pan A, it should be noted that at its forward end, it is provided with a centering guide 52 which extends crosswise of the pan. This guide has spaces or notches 57 which are positioned along the length of the guide at intervals suited to the positions of the heat exchange elements E when they are ready for operation. In some instances, and the one here shown is such, the elements E are hinged and capable of movement apart for cleaning purposes. The guide 52 is used in aligning these elements when they are brought into the neighborhood of their operating positions. When in their operating positions, their fins 53 enter the apexes of the inverted grooves of the pan bottom 11 and rest therein. The notches 57 preferably give the fins their initial guidance and the inverted pan bottom grooves give them their final setting. The notches 57 may be used to give the final setting also, if desired. Preferably, however, the pan bottom grooves are employed to give the final setting and this is what is shown in the drawings. When this is done, the notches 57 are made large enough to permit the fins 53 on the elements E to engage the bottoms of the inverted grooves. In such case the pan A rests upon the upper ends of the heat exchange elements.

In service, the liquid will be supplied through the pipes 42, 43 and 41 to the manifold D, and from the latter, it will pass down through the nozzles 38 into the space within the covered pan, and there spread throughout the space and pass through the several openings 22, and thus be delivered to the opposite sides of the elements E over which it passes in equal film-like streams. At the lower ends of the elements E, it is collected in any suitable way.

In Fig. 8 I have illustrated the novel distributor in association with a heat exchanger and other associated apparatus. In brief, what is there shown includes a filter or like receiver 49 to which milk or the like may be delivered through a pipe 58 from any suitable source. From the filter 49 a pipe 59 leads to a pump 60. The latter is a centrifugal pump driven by an electric motor 61 and delivers the liquid through a pipe 62 which is connected by a coupling 63 to supply pipe 42. The liquid is thus delivered through pipes 42, 43 and 41 to the manifold D and by the latter to the associated heat exchange elements E. After passing down over these elements, the liquid is caught in a collecting trough 64. From the latter it is conducted away to any desired point through an outlet connection 65.

The simple diagram illustrates how the liquid may be supplied to the distributor, under pressure. Obviously, in a short-time pasteurizing system a very different arrangement of apparatus would be required. However, where the liquid is supplied under pressure it will be seen that the liquid within the distributor is quite independent of any head produced by gravity. It will also be apparent that the liquid within the interior of the distributor is not of large volume. In short-time pasteurization, the capacity of the distributor is preferably just equal to the capacity of the heat exchange elements E with which it is associated. In other words, there is no holding back of the liquid when it reaches the distributor with resultant loss of heat and therefore a reduction in the efficiency of the plant. The distribution of the liquid from the manifold to the covered pan is also such as to even up the temperature in all parts of the pan. This is brought about largely by having the mouth of each nozzle 38 opposite a portion of the bottom 11 of the pan which is imperforate. In other words, by projecting the liquid against an imperforate surface, there results a more even distribution than if the same were projected against a zone of the bottom 11 in which the perforations 22 were located. This is an important feature in respect to an even distribution and proper travel of the liquid through the heat exchanger. Likewise, because of the small amount of liquid within the distributor, foaming is cut down where the liquid is capable of foaming. This is an important point. Where air in the form of foam is present, the same is very slow in reaching a desired temperature. Hence, where foam is present the rate of heat transmission is greatly reduced. With the present new distributor, whatever little foam there may be is forced out along with the liquid in small particles and is immediately broken up. There are no great accumulations of foam in the collecting trough, such as is the case where the old type of distributor is used. Although nothing has been said about the controlling medium which passes through the elements E, it will be understood that any suitable medium may be employed, such as steam, hot water or the like, for heating the controlled liquid, or ammonia, brine or other like refrigerant where the controlled liquid is to be cooled. It may be noted also that where the liquid to be treated is supplied under pressure, there is an entire independence of static head and a uniformity of flow is provided which is quite independent of the geographic position of the apparatus. Where a pump is employed, the pressure is governed entirely by the pressure at the pump, and this is positive. Other advantages will be apparent to users of the new distributor.

Obviously, in carrying out my invention, many alterations and modifications may be made in the structure illustrated. I therefore do not wish to be limited to the exact structure shown, but in drafting the appended claims I have sought to cover all alterations and modifications which rightly come within the scope of the invention.

I claim:

1. A pressure distributor for heat exchangers comprising a shallow liquid-distributing pan having a bottom provided with rows of liquid-distributing openings adapted to be aligned with one or more upright trickle-type heat exchange elements, a removable cover for said pan, said assembled pan and cover providing when in operation a substantially horizontal shallow pressure-tight enclosure for holding the liquid under pressure, means for firmly holding said pan and cover together at their peripheries to maintain said enclosure pressure-tight, a liquid-supply manifold above said cover having a horizontally extending cylindrical main chamber, means for opening and closing said chamber at its ends to enable the same to be readily cleaned, and a series of vertical nozzles uniting said chamber and cover to place said chamber in communication with the shallow enclosure formed when said pan and cover are assembled, said nozzles also being straight, whereby they may be readily cleaned when said cover and pan are disassembled.

2. A pressure distributor for heat exchangers comprising a shallow liquid-distributing pan having a bottom provided with alternate perforate and imperforate zones, said perforate zones being adapted to align with upright trickle type heat exchange elements to deliver liquid thereto, a removable cover for said pan, said assembled pan and cover providing when in operation a flat substantially horizontal pressure-tight enclosure for holding the liquid under pressure, means for firmly holding said pan and cover together at their peripheries to maintain said enclosure pressure-tight, a liquid-supply manifold above said cover, and manifold duct means wherein each duct leading from said manifold opens into said shallow enclosure at a point opposite an imperforate portion of said bottom.

3. A pressure distributor for heat exchangers of the trickle type comprising a shallow liquid-distributing pan having rows of liquid-distributing openings in its bottom, which rows are positioned therein to register with the heat exchange element or elements of the exchanger with which the distributor is to be used, a removable cover, means for securing said cover in place on said pan with pressure-tight joints whereby the resulting enclosure will be capable of holding liquid under pressure, a liquid-supply manifold above and adjacent to said cover, and parallel manifold ducts for conducting liquid under pressure from said manifold to said enclosure, said ducts being relatively short and secured at their upper ends to said manifold and at their lower ends to said cover, said connected cover, manifold and ducts thus being readily handled as a unit, said ducts being cleanable through their lower ends when said unit is removed, and said manifold having openable ends likewise provided for cleaning purposes.

4. A pressure distributor for heat exchangers of the trickle type comprising a shallow liquid-distributing pan having rows of liquid-distributing openings in its bottom, which rows are positioned therein to register with the heat exchange element or elements of the exchanger with which the distributor is to be used, a removable cover, a spacing and sealing member between coacting portions of said pan and cover, means for pressing said pan and cover against said spacing and sealing member to provide the covered pan with pressure-tight joints whereby the resulting enclosure will be capable of holding liquid under pressure, a liquid supply manifold above and adjacent to said cover, and parallel manifold ducts for conducting liquid under pressure from said manifold to said enclosure, said ducts being permanently secured at their upper ends to said manifold and at their lower ends to said cover, said connected cover, manifold and ducts thus being readily handled as a unit, said ducts being cleanable through their lower ends when said unit is removed and said manifold having openable ends likewise provided for cleaning purposes, and said spacing and sealing member being composed of layers of cushioning material whereby the depth of said enclosure may be varied by varying the thickness of said member.

5. A pressure distributor for heat exchangers of the trickle type comprising a shallow liquid-distributing pan having rows of liquid-distributing openings in its bottom, which rows are positioned therein to register with the heat exchange element or elements of the exchanger with which the distributor is to be used, a removable cover, a spacing and sealing member between coacting portions of said pan and cover, means for pressing said pan and cover against said spacing and sealing member to provide the covered pan with pressure-tight joints whereby the resulting enclosure will be capable of holding liquid under pressure, a liquid-supply manifold above and adjacent to said cover, and parallel manifold ducts for conducting liquid under pressure from said manifold to said enclosure, said ducts communicating at their upper ends with the interior of said manifold and at their lower ends with the under side of said cover, said spacing and sealing member being composed of layers of cushioning material whereby the depth of said enclosure may be varied by varying the thickness of said member.

TIMOTHY MOJONNIER.